United States Patent Office 3,451,949
Patented June 24, 1969

3,451,949
CATALYST FOR REFORMING HYDROCARBONS
Haldor Frederik Axel Topsoe, 73 Baunegardsvej, Hellerup, Denmark; Emil Sorensen, 54 Haraldsborgvej, Roskilde, Denmark; and Erik Mogensen, 10 Bredesvinget, Virum, Denmark
No Drawing. Filed Jan. 10, 1964, Ser. No. 336,869
Claims priority, application Denmark, Jan. 15, 1963, 184/63
Int. Cl. B01j 11/22
U.S. Cl. 252—455                           7 Claims

ABSTRACT OF THE DISCLOSURE

The present invention relates to a process for the preparation of gas mixtures containing hydrogen, carbon monoxide and carbon dioxide, as well as nitrogen by reforming hydrocarbons in the gaseous phase by means of oxygen containing gases such as carbon dioxide, oxygen, air or preferably steam, or mixtures thereof, in the presence of a catalyst impregnated on a porous carrier or support, the catalyst being active nickel and/or nickel oxide, and an activator or promotor in the form of alkali metals or alkaline earth metals or compounds thereof, and catalysts therefor.

---

The present invention relates to a process for the preparation of gas mixtures containing $H_2$ and further containing CO and/or $CO_2$ and, if desired, $N_2$, by reforming in the gaseous phase hydrocarbons by means of oxygen-containing gases in the form of $CO_2$, $O_2$, air or preferably steam, or mixtures thereof, in the presence of a catalyst in the form of a porous carrier or support impregnated with catalytically active nickel and/or nickel oxide and an activator or promotor in the form of alkali metals or alkaline earth metals or compounds thereof.

Such reforming processes are known. They often are carried out, and by the method of the invention preferably by means of steam, and particularly they are used for producing municipal gas (lighting gas, ordinary town's gas) or for producing a hydrogen-containing gas for use in the synthesis of methanol, ammonia and other products, and for instance for producing gas for reduction purposes. As raw material it is known to employ both gaseous and liquid hydrocarbons.

The reformed gas contains $H_2$, CO, $CO_2$ and $CH_4$ in quantities determined by the reaction conditions, among others; pressure, temperature and steam quantity. Traces of higher hydrocarbons, especially $C_2H_6$, may also occur in the output gas mixture. If the gas mixture should contain $N_2$, the latter is generally added for instance in the form of air or $N_2$, to the material introduced in the reactor.

The reforming processes are markedly endothermic, and the heat supply necessary for the reactions may be effected in various manners. In a tubular reformer, heat is supplied by means of burners placed outside the reactor, whereas in autothermic reformers the heat is supplied through combustion of part of the hydrocarbons with oxygen and/or air in the reactor itself.

In the present process, which particularly aims at reforming hydrocarbons in tubular reformers, preferably at temperatures between about 350° C. and about 900° C., there is used—for reasons to be explained later—a promoted catalyst essentially free from silicon and compounds thereof, especially silicates, and which contains maximally 0.1% thereof, calculated as $SiO_2$, and in which the promotor, consisting of a potassium or calcium compound, has been deposited on the carrier in an atomic proportion to nickel of at least 1:10.

When treating methane or natural gases having a high content of methane, there are seldom difficulties in connection with the reforming process: the principal reactions during this process are the following:

$$CH_4 + H_2O \rightleftharpoons CO + 3H_2$$

$$CH_4 + 2H_2O \rightleftharpoons CO_2 + 4H_2$$

$$CO + H_2O \rightleftharpoons CO_2 + H_2$$

$$CH_4 + CO_2 \rightleftharpoons 2CO + 2H_2$$

and in an analogous manner with other hydrocarbons, and the equilibrium between such reactions will determine the composition of the output gas mixture.

When reforming relatively heavy paraffins, for instance benzine (gasoline; petrol) fractions, or hydrocarbon mixtures consisting of or containing substantial quantities of olefins, aromatic hydrocarbons and/or naphthenes, there is considerable risk of deposition of coke on the catalyst; by the expression "catalyst" we mean in this connection the aggregate of carrier, catalytically active material (Ni and/or NiO) and promotor. The invention particularly aims at reforming such difficult hydrocarbons and hydrocarbon mixtures; this term especially covers the heavier paraffins, i.e. paraffins having from 4 to 16 C-atoms, olefins with from to to 16 C-atoms, mostly paraffins and olefins with 12 C-atoms maximally, aromatic hydrocarbons and naphthenes, and mixtures containing substantial amounts of one or more of the said groups of compounds; by substantial amounts is not necessarily meant that more than half of the mixture consists of such difficult hydrocarbons.

Besides drop of pressure in the reactor and other inconveniences, the deposition of coke on the catalyst may also cause disintegration of the catalyst; said catalyst preferably has the form of porous bodies impregnated with a catalytically active material of the nickel type, i.e. nickel oxide and/or nickel, the oxide at the pressures and temperatures prevailing in the reactor presumably having been reduced to the free metal, which thus presumably predominantly constitutes the catalytically active material. The latter is usually placed on a porous carrier or support material. As support material it is known to use, for example, ceramic and the like materials, e.g. chamotte, kaolin, magnesium or aluminium silicates or both, or more or less pure oxides of magnesium and aluminium. The materials may for instance have been formed to porous bodies which have afterwards been impregnated with the catalytically active material, or the latter may have been added to the raw materials before forming them to bodies.

The inconveniences in connection with the reforming of the above mentioned difficult hydrocarbon mixtures are usually countered partly by carrying out the process with a great excess of steam, which is uneconomical, partly by carrying out the process at a pressure only a few atmospheres above atmospheric pressure. If the purpose of the reforming process is to produce a synthesis gas, as is very often the case, it is, however, of considerable economic importance to carry out the process at the highest possible pressure, since thereby a saving of compression work is obtained.

It has been found that the tendency of the nickel catalyst to liberate free carbon during the reforming of the aforesaid difficult hydrocarbon mixture can be reduced by means of so-called promoting. Hereby is meant the addition to the catalyst of a substance not necessarily having catalytic properties in itself, but being capable of altering the character of the catalytically active part. In reforming catalysts it is known to use alkali and alkaline earth metals, especially potassium and generally in the form of potassium oxide, as promotors in such processes, but only in very small amounts (about 1% of the amount of nickel) and it has now been found that such small amounts of potassium are insufficient to promote the catalyst to the extent required in case it is intended to reform difficult hydrocarbon mixtures as defined. It has now particularly been found that the quite insignificant amount of promotor is insufficient when it is desired to work in the most economical way, i.e. at high pressures, for instance about 6 to 30 atmospheres or more, or with the lowest possible excess of steam. Notwithstanding the promotion, a deposition of carbon (cooking) on the catalyst may therefore take place when an insufficient amount of promotor is employed, this causing inconveniencies during reforming of the hydrocarbons, for instance drop of pressure and at worst destroying of the catalyst, for instance disintegration thereof.

Besides, particularly when reforming difficult hydrocarbons by means of a nickel catalyst promoted with alkali or alkaline earth metal oxides, a quite special difficulty will arise, if the catalyst, i.e. the aggregate of support bodies, catalytically active nickel or nickel oxide, and promotor, contains noteworthy quantities of silicon in the form of silicon oxide, silicon dioxide or silicates. It has been found that in case silicon compounds as mentioned are present on or in the catalyst, a reduction of the catalytical activity occurs together with the addition of the alkali metal or alkaline earth metal promotor. It has been found, however, that this will not be the case if the catalyst as a whole, i.e. both the support material and the catalytically or promotorially active part is essentially free from silicon.

Some experiments will show this difference of activity in promoting a silicon-containing and a silicon-free catalyst. For practical reasons the experiments have been executed with methane, allowing an easy comparison between the degrees of activity of various catalysts.

The experiments were carried out in a tubular, electrically heated reactor having an inner diameter of 25 mms., in which 5 mls. of a catalyst were placed which had previously been diluted with a suitable amount of an inactive ceramic material; the inactive material had, as had the catalyst itself, a size of 2–3 mms. and the form of fragments of greater bodies. The inactive diluting material exclusively served to secure uniform temperature in the entire catalyst layer. In this reactor a mixture of 6.2 moles of steam and 2.07 moles of methane was introduced per hour. The mixture passed through the catalyst layer which had a constant temperature of 650° C. The pressure in the reactor during the experiments was 5.85 atma. (i.e. atmospheres absolute). The amount as well as the composition of the reaction products leaving the reactor were measured, and on the basis thereof the percentage of methane added converted into carbon dioxide and carbon monoxide was calculated. The results are shown below in table and partly relate to a silicon-containing nickel catalyst, partly to a silicon-free nickel catalyst on a support consisting predominantly of spinel. Both catalysts were used with as well as without promotor in the form of a potassium compound. It is mentioned for comparison that the theoretically possible rate of conversion under the conditions prevailing is 58%.

| Experiment No.: | Support Material | Atomic proportion K:Ni | Percent $CH_4$ converted to $CO_2+CO$ |
|---|---|---|---|
| A | Silicon-containing | 0:100 | 24 |
| B | do | 3:100 | 04 |
| C | Silicon-free spinel | 0:100 | 25 |
| D | do | 3:100 | 36 |
| E | do | 15:100 | 27–30 |

A comparison between tests A and C shows that the two catalysts have equal activity in unpromoted condition.

Comparison between tests A and B on the other hand shows that the activity, when promoting the silicon-containing catalyst with potassium was already unsatisfactorily low at a ratio K to Ni of 3 to 100, whereas a comparison between the tests C and D shows that on promotion of the silicon-free catalyst, even an improvement of activity takes place at a content of potassium as low as that stated.

It is not quite known why the silicon-containing catalyst being promoted with alkali metal is deteriorated to that extent. It may be as assumed, however, that the promotor, which is strongly alkaline, is destroyed by reaction with the predominantly acidic silicon-containing part of the catalyst, whereby alkali-silicates having predominantly low melting points are formed. It is contributing factor in this deterioration that potassium oxide as well as silicon oxide or silicates in the reducing atmosphere and high temperature prevailing have a certain vapour pressure in the form of K and SiO, respectively, so that the reaction can take place via the gas phase. Finally, it has been found that the non-presence of silicon is a condition for avoiding coke deposition in the reforming of difficult hydrocarbons by means of a promotor; this will appear particularly from the Example 7 below.

Thus, it will be understood that there are three essential conditions for rationally reforming difficult hydrocarbon mixtures, i.e. such mixtures having a substantial content of relatively heavy paraffins, light or heavy olefins, aromates and/or naphthenes, by means of a catalyst of the nickel type and the like: (1) Promotion with alkali metal or alkaline earth metal; (2) presence of the promotor in an amount relative to the catalytically active material, especially nickel or nickel oxide, substantially higher than was hitherto considered necessary; and (3) that the catalyst be essentially free from silicon in the form of compounds thereof, especially SiO, $SiO_2$ and silicates. If these requirements are fulfilled, the said inconveniences are avoided also when reforming hydrocarbon mixtures consisting of or containing substantial amounts of difficult hydrocarbons as defined.

Consequently, the characteristic features of the invention are that in reforming processes of the kind in question, a catalyst is used having the form of porous bodies impregnated with catalytically active material and promotor, in which the aggregate of carrier, catalytically active Ni or NiO and promotor contains at most 0.1% of silicon and/or silicon compounds, calculated as $SiO_2$, and that the promotor consists of a potassium or calcium compound deposited on the inner and outer surfaces of the carrier in an atomic proportion to nickel of at least 1:10, that is to say in such manner that the atomic ratio K:Ni or Ca:Ni is at least 1:10. It does not seem to be critical whether the promotor is present in the form of any particular compound, for instance as an oxide. It must be assumed that during the use of the catalyst the promotor will be converted into the most stable form, which may be the oxide, the carbonate or the hydroxide, or mixtures thereof; other compounds are also usable. It has not been possible to determine with certainty the state of the promotor during use in the reactor.

The invention also relates to the catalyst itself with the properties described. The said amount of promotor is sufficient to essentially avert deposition of coke on the catalyst, and thereby to prevent unnecessary drop of pressure and disintegration of the catalyst, and in case the latter is free from silicon, no poisoning of the promotor or catalyst will occur. Preferably materials are used in all components of the catalyst, which do not contain analytically traceable silicon.

As already mentioned, it is preferred to use potassium or calcium as the promotor, and the catalyst has on its inner and outer surfaces preferably deposited the promotor, conveniently in the form of potassium or calcium oxide, hydroxide, carbonate or nitrate in an atomic ratio of K:Ni or Ca:Ni in the range 1:10 to 5:1, most conveniently between 15:100 and 45:100.

In itself the upper limit of the calcium or potassium content does not seem to be particularly critical; however, since in the pore system of the catalyst there should be space for both the catalytically active material, i.e. nickel and/or nickel oxide, and the promotor, and since the amount of nickel cannot be reduced infinitesimally, the aforesaid upper limit of the content of promotor may be convenient. By way of example a ratio K:Ni of 100:225 has been used with good result.

It may be mentioned that the amount of Ni and/or nickel oxide on the catalyst conveniently may constitute from 2 to 40% and preferably from 3 to 15% of its total weight. When the content of promotor is relatively low, the content of nickel may be increased but hardly anything is obtained thereby, and the limits given on the one hand pay regard to sufficient catalytical activity, and on the other hand to the space or room available for the promotor and catalytically active material on the inner and outer surfaces of the catalyst (pore surfaces). The exact adjustment of the relative amounts of catalytically active material to promotor is effected with consideration to the pore structure of the carrier material, the pore size and pore distribution and to the hydrocarbons to be treated. Besides K and Ca, probably other alkali and alkaline earth metals can be used as promotors; their effect has not been examined closely, however.

As to the experiments described above concerning the importance of non-presence of Si-compounds, especially such as silicates and oxides thereof, it should be noted, however, that the ratios of promotor to nickel used (K:Ni=3:100), except for test E, are under the limit prescribed. However, methane has been used for the experiments, that is, a hydrocarbon which can be reformed without risk of coking, so that these experiments cannot be taken as a criterion of the desirable or necessary amount of promotor. It is intended by the experiments to demonstrate the noxious influence of Si-compounds on a catalyst containing a promotor as described.

It has also been found that silicon is a catalyst poison for the catalytically active nickel or nickel oxide, probably thereby that it reacts with nickel under formation of low-melting silicides in analogy to the known formation of iron and platinum silicides under similar conditions. Besides, in a reducing atmosphere, especially at high reaction temperatures, silicon may segregate from the catalyst in the form of gaseous SiO, which in the colder parts of the plant are deposited as solid SiO or, after reoxidation, as $SiO_2$; thereby the pipelines may be choked or congested.

When using essentially silicon-free materials for the catalyst, one obtains, therefore, a long-living catalyst, so that the reforming process can be performed at high pressure and low steam excess without chemical decomposition and consequent mechanical disintegration of the catalyst, without deposition of coke on the catalyst and without reaction between the promotor and the carrier material or without the silicon in the carrier poisoning the catalyst.

The catalyst is preferably used as formed bodies or fragments of formed bodies of a desired size and shape, consisting of porous carrier or support material in which the substances acting as catalyst and promotor or activator are present. As carrier material for the nickel catalysts it is known to use regularly or irregularly shaped porous bodies of for instance ceramic materials like chamotte, kaolin, pumice, magnesium or aluminium silicates or both, or more or less pure magnesium oxide, aluminium oxide or other metal oxides. It has been found that it is particularly convenient to use as support material substantially Si-free, largely into spinel converted magnesium oxide and aluminium oxide, i.e., a magnesium-aluminium-spinel, $MgAl_2O_4$, which, if desired, in the spinel structure contains other metals and possibly a not too great amount of free oxides of such metals. Such supports of spinel, a catalyst on such support and a process for their preparation has been described detailed in the specification to patent application No. 330,531 filed on Dec. 16, 1963 in the name of Poul Thygesen and shall not be described fully here. They have the advantage of being extremely resistant to exacting physical and chemical influences.

Generally, it is favourable, therefore, to use a Si-free nickel catalyst when reforming hydrocarbon mixtures with steam, but in particular it is advantageous to use a nickel catalyst having a large quantity of promotor on a spinel-type support material, the aggregate being essentially silicon-free, i.e. containing at most 0.1% of silicon-compounds, calculated as $SiO_2$, in case difficult hydrocarbons as defined are to be reformed. It is possible thereby to avail oneself of the circumstance that it has been possible in recent years to manufacture tubular reactors for reforming purposes for use at increasingly higher working pressures, so that the reforming process can now be performed at 30 atmospheres or even higher pressures. This increase of pressure during the run of the reactor is generally bound to increase the tendency of deposition of free carbon (coke) on the catalyst when reforming the said difficult hydrocarbon mixtures. This can be countered, however, by raising the content of promotor in excess of the quantity normally used in other cases. Whereas a silicon-containing nickel catalyst can only be promoted with a limited amount of promotor without reduction of its activity, a silicon-free catalyst, and especially a nickel catalyst on a spinel carrier, may contain considerable amounts of the promtor, an increased activity thereby even being obtained. With potassium or calcium as promotors, an atomic ratio of K to Ni or Ca to Ni of 45 to 100 or more can be used.

When preparing the catalyst according to the invention, it is convenient to proceed in the manner first to prepare porous bodies of a desired size and shape from a temperature-resistant support material containing at most 0.1%, calculated as $SiO_2$, of silicon or silicon compounds, after which, in arbitrary succession or simultaneously, these bodies are impregnated with a substantially Si-free nickel compound capable of being calcined to NiO, and with an essentially Si-free potassium or calcium compound, keeping the ratio of K to Ni or Ca to Ni at at least 1 to 10, whereupon, after each impregnation, the bodies are heated for calcination of the nickel compound and, in some cases, total or partial calcination of the potassium- or calcium compound. When preparing promoted nickel catalysts on carrier bodies it has heretofore been common practice to proceed in the way that all raw materials were mixed in desired proportions, whereupon the mixture was heated as an entity. This, however, has the drawback that the catalytically or promotorially active material may react with the raw materials for forming the support bodies, so that one cannot control the amounts of catalytically and promotorially active substances, and especially not the ratio of one to the other in the final catalyst. This is avoided by the process proposed. It is possible to use preshaped porous bodies of a suitable, essentially silicon-free carrier material. The bodies may have arbitrary size and shape; it is especially preferred to use the dimensions stated in the above named patent application No. 330,531 of December 16, 1963.

Especially when using carrier bodies of spinel, the proposed procedure is advantageous, since thereby it is in practice possible to avoid that the catalytically and promotorially active substances become to any considerable degree built in into the spinel structure. As nickel compound it is convenient to use the nitrate, as potassium- or calcium compound for instance a nitrate, a hydroxide or a carbonate, a possible conversion thereby being possible by the liberation of substances (nitrogen oxides, $H_2O$, $CO_2$) departing in gaseous form.

It is particularly advantageous, and therefore preferred, to perform the impregnation with the nickel compound and the potassium or calcium compound in one step, i.e. simultaneously, since thereby a particularly intimate mixture of catalytically and promotorially active materials is obtained, and hence an extraordinarily effective promotion. When carrying out simultaneous impregnation, one conveniently uses both Ni and K or Ca in the form of nitrates. As material for the impregnation, liquids are conveniently used, either melts or solutions, preferably in water.

In the following the invention will be described more in detail by way of some non-limittaive examples. For practical reasons these examples are set up schematically beside one another, whereby a ready comparison is facilitated.

Examples 1–7

In the experiments a tubular, electrically heated reactor having an inner diameter of about 25 mms. was used. In the reactor, 100 mls. of a catalyst was placed; it occupied about 20 cms. of the length of the reactor, the total length of which was 100 cms. The catalyst bodies were formed as cylindrical tabloids having a height of 3 mms. and diameter of 3 mms. A mixture of steam and vaporised hydrocarbon mixture was introduced into this reactor. The mixture passed the catalyst bodies, after which the reaction products left the reactor. The amounts of gases introduced as well as the amounts of reaction products were measured. Below the composition of the hydrocarbon mixtures used in the examples is given.

|  | Benzine, Examples 1, 2, 3, 6 and 7 | Benzine Example 4 |
|---|---|---|
| Range of boiling point, °C | 38–100 | 118–187 |
| Density at 15° C., gms./mls. | 0.675 | 0.761 |
| Composition: | | |
| Paraffins, percent by weight | 100 | 60 |
| Olefins, percent by weight | 0 | 0 |
| Naphthenes, percent by weight | 0 | 25 |
| Aromates, percent by weight | 0 | 15 |

$C_2$–$C_4$ fraction

Example 5

| Composition: | Percent by volume |
|---|---|
| $C_2H_4$ | 17.3 |
| $C_2H_6$ | 2.5 |
| $C_3H_6$ | 0.0 |
| $C_3H_8$ | 63.9 |
| $C_4H_8$ | 14.8 |
| $C_4H_{10}$ | 1.5 |

In Examples 1–6, a support was used predominantly consisting of spinel, $MgAl_2O_4$, without traceable contents of silicon, impregnated with catalytically and (except for Example 1) promotorially active material. In Example 7, a silicon-containing support was used. In the table, nl. designates normal-liters, that is volume at atmospheric pressure and 0° C.

The results of the experiments will appear from the table below.

| | Example No. | | | | | | |
|---|---|---|---|---|---|---|---|
| | 1 | 2 | 3 | 4 | 5 | 6 | 7 |
| | | | | Promotor | | | |
| | | K | K | K | K | Ca | K |
| Atomic ratio, promotor:Ni | 0 | 6:100 | 10:100 | 10:100 | 45:100 | 15:100 | 45:100 |
| Duration of experiment, in hours | 10 | 10 | 270 | 100 | 170 | 90 | 2 |
| Temperature in reactor, ° C.: | | | | | | | |
| At 0 cms. (catalyst beginning) | 473 | 487 | 480 | 485 | 330 | 470 | 518 |
| At 10 cms | 668 | 663 | 625 | 625 | 433 | 580 | 584 |
| At 20 cms. (catalyst end) | 767 | 767 | 700 | 693 | 695 | 670 | 668 |
| Pressure in reactor, ata | 5.8 | 5.8 | 20.4 | 20.4 | 20.4 | 20.4 | 20.4 |
| Input quantities in gas mixture: | | | | | | | |
| Hydrocarbon mixture grammes/hour | 26.0 | 37.8 | 54.6 | 52.3 | 66.2 | 86.3 | 97.0 |
| Steam, grammes/hour | 236 | 233 | 118 | 126 | 360 | 238 | 240 |
| $H_2$, nl./hour | 7 | 7 | 0 | 0 | 16.8 | 0 | 0 |
| $T_2$, nl./hour | 0 | 0 | 10 | 9 | 0 | 10 | 4.2 |
| Mols $H_2O$/atom C | 7.1 | 4.9 | 1.75 | 1.90 | 4.2 | 2.20 | 1.96 |
| Output quantities in gas mixture: | | | | | | | |
| Dry gas, nl./hour | 162 | 216 | 181 | 176 | 289 | 270 | 275 |
| Water, grammes/hour | 181 | 162 | 57.5 | 63 | 272 | 143 | 146 |
| Composition of gas, mole-percentage: | | | | | | | |
| $N_2$ | 0.00 | 0.00 | 5.00 | 4.39 | 0.00 | 3.48 | + |
| $H_2$ | 75.6 | 74.2 | 48.32 | 49.05 | 62.60 | 47.66 | + |
| CO | 8.5 | 9.9 | 7.85 | 8.19 | 5.67 | 6.69 | + |
| $CO_2$ | 15.9 | 15.5 | 16.32 | 17.68 | 18.60 | 17.65 | + |
| $CH_4$ | 0.03 | 0.34 | 22.46 | 20.61 | 12.41 | 24.42 | + |
| Drop of pressure over the catalyst, mms. water: | | | | | | | |
| At start of the experiment | 70 | 30–40 | 10–15 | 10–15 | 5–10 | 5–10 | 10–15 |
| At end of the experiment | 600 | 30–40 | 10–15 | 10–15 | 5–10 | 5–10 | 300 |
| Content of carbon in the catalyst after the experiment, percent by weight | 10 | 5 | 0.7 | 0.2 | 0.3 | 0.4 | 30 |

+ Not measured.

It should be noted that the experiment represented by Example 1 was carried out without promotor, and that the amount of promotor in the experiment represented by Example 2 is smaller than according to the invention it has been found necessary to reform difficult hydrocarbons.

Example 1 shows that a considerable coke deposition takes place on an unpromoted catalyst, very soon causing a vigorous drop of pressure over the catalyst.

Example 2 shows that such increasing drop of pressure does not take place if the catalyst contains a small amount of promotor, in spite of the fact that the supply of vapor relative to the hydrocarbon quantity was reduced in comparison with Example 1. However, some coke was deposited on the catalyst, from which fact it emanates that the amount of promotor relative to the amount of catalytically active material is insufficient.

The following experiments were of considerably longer duration and all proceded without noteworthy separation of carbon on the catalyst, notwithstanding that the pressure during these experiments was higher and the ratio $H_2O/C$ substantially lower. The duration of the experiments does not mean that the process cannot be performed over a very long period.

A comparison between Examples 2 and 3 shows that it is possible, by using a relatively larger quantity of potassium to reduce the steam quantity considerably, which highly improves the economy of the process. Example 4 shows that even with a much more heavy benzine fraction it is possible to perform the process with a small amount of steam.

Example 5 shows reforming of a $C_2$–$C_4$ fraction containing olefins. Finally Example 6 shows that potassium can quite satisfactorily be substituted with calcium as promotor.

In Examples 3–6, the results essentially correspond to the theoretically expected thermodynamic equilibrium.

Example 7 shows that the presence of silicon in the catalyst (support) is extremely noxious to the process, since already after 2 hours a drop of pressure arose in such degree that the experiment had to be discontinued.

This drop of pressure is mainly due to the very great deposition of coke on the catalyst, which did not occur in Examples 3-6, it should be noted that a deposition of carbon smaller than 1% of the catalyst weight has no importance whatever.

In particular, Example 7 should be compared with Example 3, in which, however, a smaller amount of promotor and a smaller vapor quantity (i.e. more exacting conditions) was used than in Example 7, without causing drop of pressure or coke deposition of any consequence whatever, even after the run had been carried out for a period of 270 hours.

We claim:

1. A catalyst for reforming hydrocarbons selected from the group consisting of paraffins having at least 4 carbon atoms, olefins, aromatics and naphthenes and hydrocarbon mixtures containing at least one hydrocarbon thereof, in the gaseous phase with an oxygen-containing gaseous substance selected from the group consisting of steam, air, oxygen, carbon dioxide and mixtures thereof into gaseous mixtures containing $H_2$, said catalyst comprising porous bodies of a refractory support material consisting predominantly of MgO and $Al_2O_3$ having the spinel type structure to such degree that at least 30 percent by weight of the support is constituted by porous magnesium-aluminum-spinel, $MgAl_2O_4$, the support bodies having deposited on their inner and outer surfaces a catalytically active material selected from the class consisting of Ni and NiO and also deposited thereon a promoter active material selected from the group consisting of free potassium nitrate, free potassium oxide, free potassium carbonate and free potassium hydroxide, wherein the improvement comprises that the relative amount of promoter material to catalytically active material, calculated as the atomic ratio of potassium in the free promoter compound to nickel in the catalytically active component is at least 1:10, the total catalyst containing at most 0.1% by weight, calculated as $SiO_2$, of silicon in elemental and chemically combined form.

2. A catalyst as claimed in claim 1, containing no analytically traceable silicon and silicon compounds.

3. A catalyst as claimed in claim 1, wherein the atomic ratio of K:Ni is between 1:10 and 5:1.

4. A catalyst as claimed in claim 1, wherein the atomic ratio K:Ni is between 15:100 and 45:100.

5. A catalyst as claimed in claim 3, wherein the amount of catalytically active Ni and NiO constitutes 2-40% by weight of the total catalyst.

6. A catalyst as claimed in claim 4, wherein the amount of catalytically active Ni and NiO constitutes a 3-15% by weight of the total catalyst.

7. A catalyst as claimed in claim 1, wherein at least 90 percent by weight of the support consists of porous magnesium-aluminum-spinel.

References Cited

UNITED STATES PATENTS

| | | | |
|---|---|---|---|
| 1,959,189 | 5/1934 | Woodhouse | 252—473 XR |
| 2,013,066 | 9/1934 | Porter | 252—473 XR |
| 2,151,329 | 3/1939 | Page et al. | 252—473 XR |
| 3,186,797 | 6/1965 | Pearce et al. | 252—466 XR |
| 3,256,207 | 6/1966 | Arnold | 23—212 XR |
| 3,271,325 | 9/1966 | Davies et al. | 252—466 |

DANIEL E. WYMAN, *Primary Examiner.*

C. F. DEES, *Assistant Examiner.*

U.S. Cl. X.R.

23—212; 48—196, 214; 252—457, 459, 466, 473, 474